Figure 1:
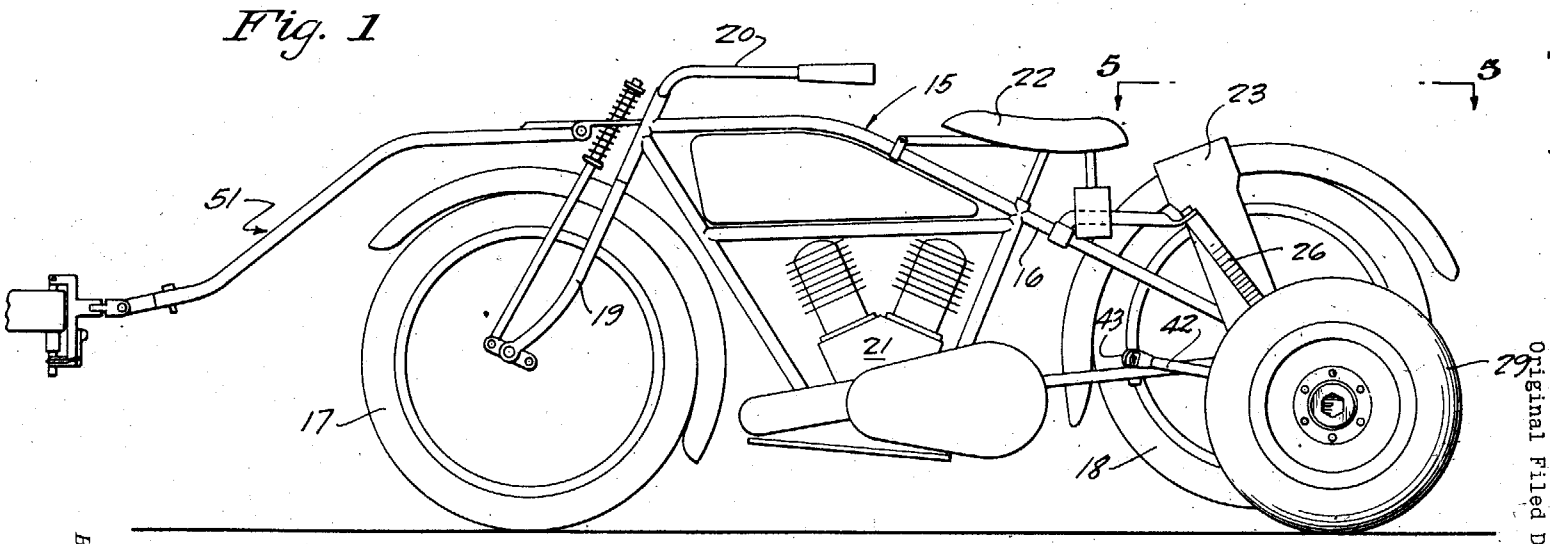

A. L. HESS

TOWABLE CYCLE

April 19, 1932. Re. 18,428

Original Filed Dec. 11, 1929 4 Sheets-Sheet 1

INVENTOR

BY Albert Laurance Hess

Westall and Wallace

ATTORNEYS

A. L. HESS

April 19, 1932. TOWABLE CYCLE Re. 18,428

Original Filed Dec. 11, 1929 4 Sheets-Sheet 2

INVENTOR

BY Albert Laurance Hess

Westall and Wallace

ATTORNEYS

A. L. HESS

April 19, 1932. TOWABLE CYCLE Re. 18,428

Original Filed Dec. 11, 1929 4 Sheets-Sheet 3

INVENTOR

BY Albert Laurance Hess

Westall and Wallace

ATTORNEYS

A. L. HESS

April 19, 1932. TOWABLE CYCLE Re. 18,428

Original Filed Dec. 11, 1929 4 Sheets-Sheet 4

INVENTOR

Albert Laurance Hess

BY

Westall and Wallace

ATTORNEYS

Reissued Apr. 19, 1932

Re. 18,428

UNITED STATES PATENT OFFICE

ALBERT LAURANCE HESS, OF LOS ANGELES, CALIFORNIA, ASSIGNOR TO CYCLETOW CORPORATION, LTD., OF LOS ANGELES, CALIFORNIA, A CORPORATION OF CALIFORNIA

TOWABLE CYCLE

Original application filed December 11, 1929, Serial No. 413,267. Renewed November 10, 1930. Original No. 1,820,139, dated August 25, 1931. Application for reissue filed August 31, 1931. Serial No. 560,441.

This invention relates to a towable cycle, and pertains more particularly to a cycle convertible into a propellable bicycle, a tricycle or a combination bicycle and tricycle. Motor propelled bicycles are advantageous for transport of persons from place to place. In many instances, it becomes desirable to tow such vehicles in the manner of a trailer attached to a motor vehicle. Due to the two point suspension and unstability of a bicycle, this becomes difficult and provision of means to provide more than two points of support becomes desirable. In my application for United States patent, Ser. No. 378,096, filed July 13, 1929. such a convertible bicycle and tricycle has been disclosed. The present invention contemplates a vehicle having bicycle wheels and auxiliary wheels arranged to be placed either in ground engaging position or out of ground engaging position whereby the vehicle may be operated as a bicycle or the auxiliary wheels may be employed for ground support. A particular instance of a field of utility for such vehicles is that wherein automobile service stations find it necessary to send a service man to drive a car from a distant point to the service station. Motorcycles are commonly used for this purpose and under the present practice, two men are sent from the service station, one to drive the car on return to the station and the other to drive the motorcycle. Such practice is uneconomical as only one man is really needed for actual work performed in driving the automobile. For this reason, a cycle, which may be driven by one man or attached to the automobile so as to be towed is desirable. In wet weather, a bicycle is subject to skidding to a greater extent than a tricycle. It is therefore desirable to provide a bicycle which may have auxiliary wheels for support when propelled.

An object of the present invention is to provide a bicycle with auxiliary wheels mounted to be swung into ground engaging position and to serve in such position while the vehicle is being propelled by the bicycle traction wheel or to hold the traction wheel out of ground engaging position and convert the vehicle into a tricycle adaptable for being towed. A more specific object of this invention is to provide such auxiliary wheels supported on foldable arms whereby the wheels may be disposed in ground engaging position to cooperate with the bicycle traction wheel, or in another position to hold the traction wheel out of ground engaging position, or in a third position whereby the auxiliary wheels are entirely out of ground engaging position. In addition to the broader objects of this invention, there are certain details of design contributing to operativeness and simplicity.

Figure 2:
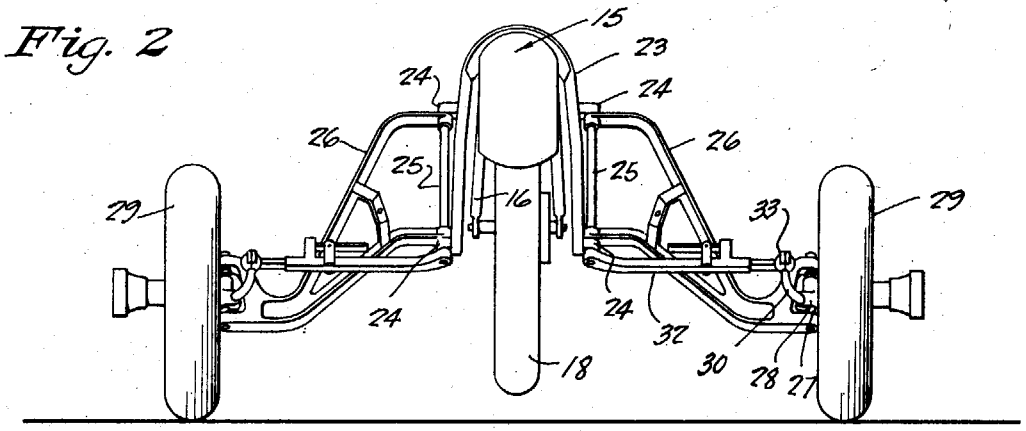
Figure 3:
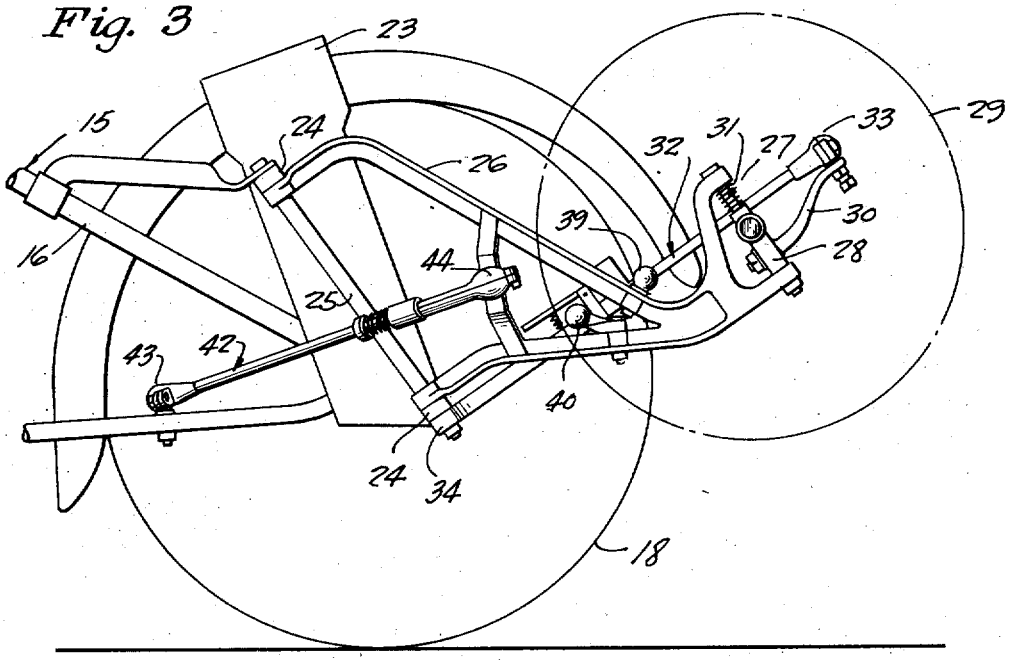
Figure 4:
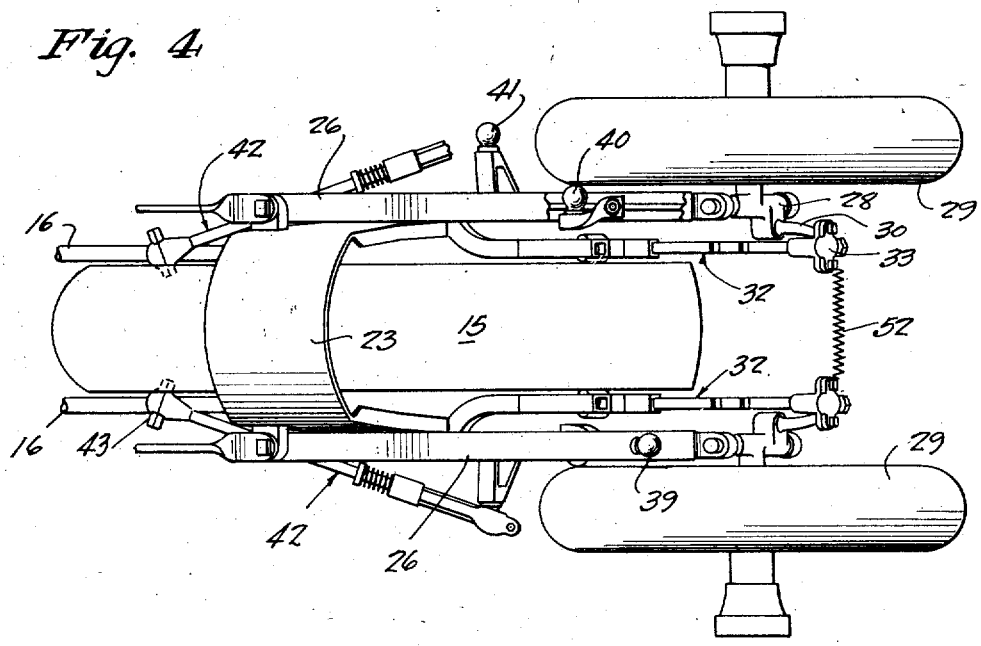
Figure 5:
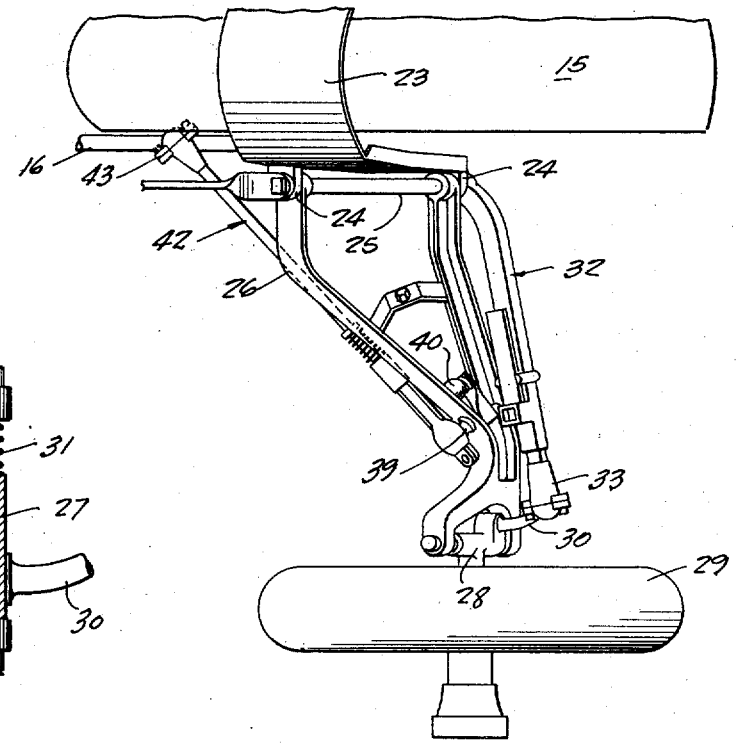
Figure 8:
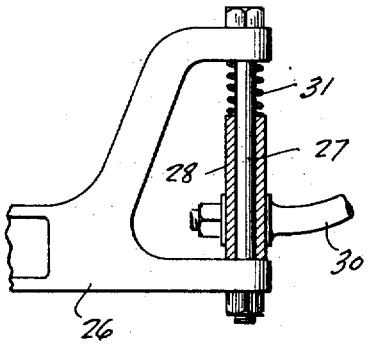
Figure 6:
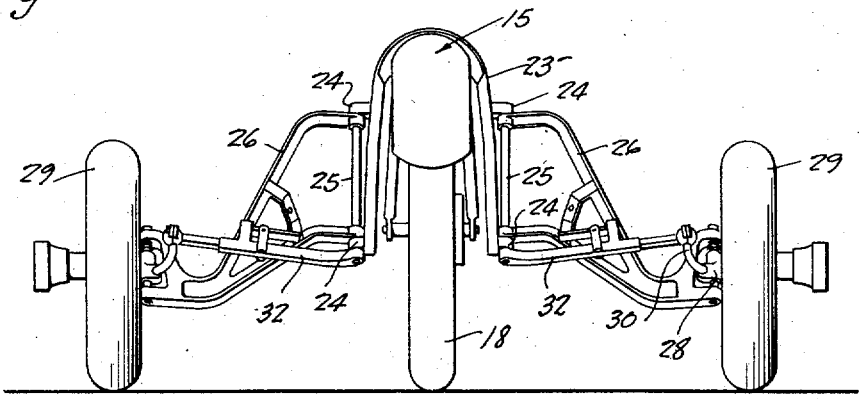
Figure 7:
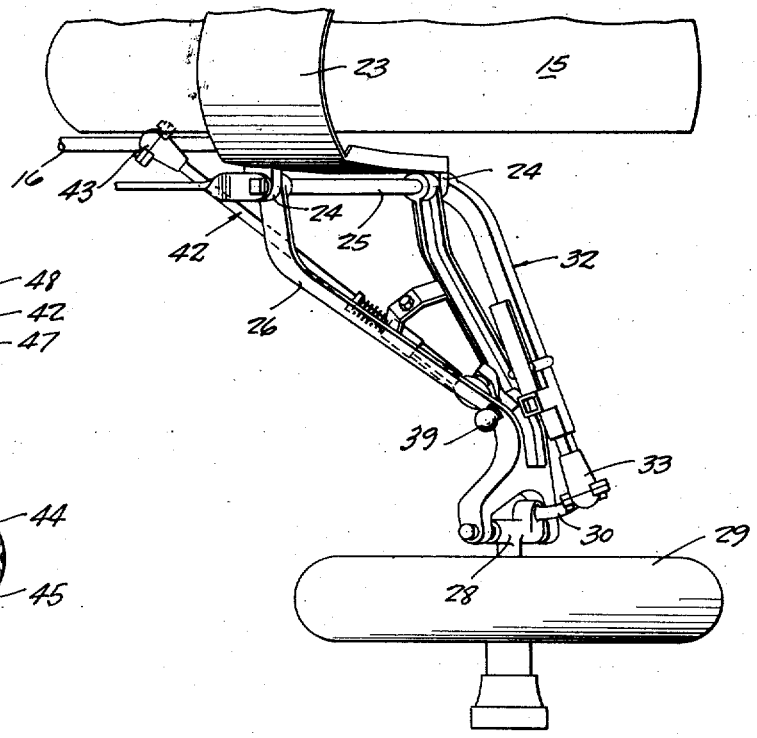
Figure 11:
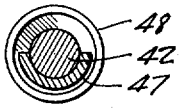
Figure 12:
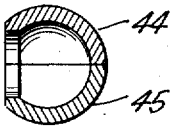
Figure 9:
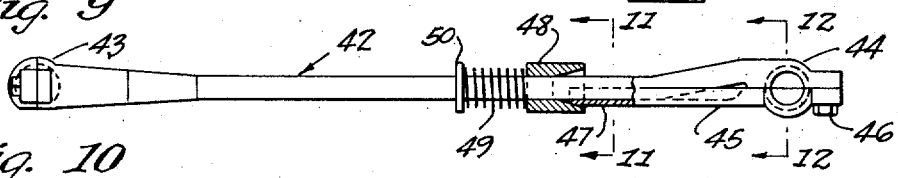
Figure 10:
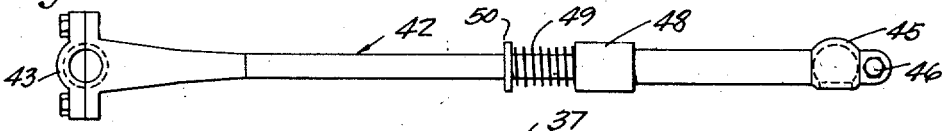
Figure 13:
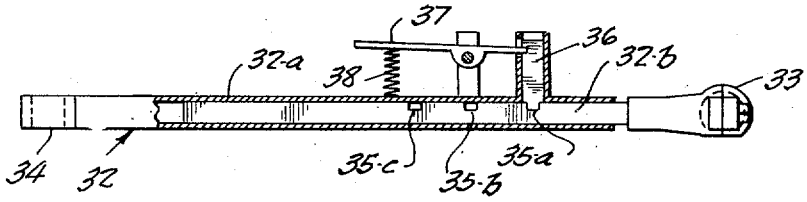
Figure 14:
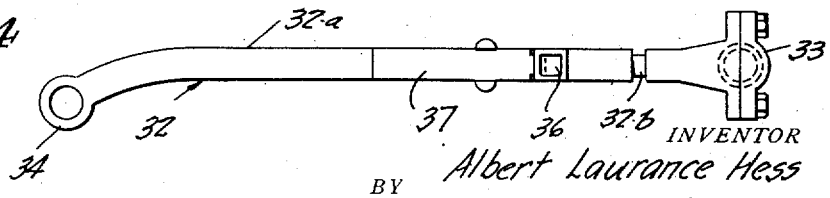

These objects together with other objects which will be apparent from the sub-joined specification are accomplished by means of the embodiment of my invention illustrated in the accompanying drawings, in which:

Fig. 1 is a side elevation of a complete vehicle with the auxiliary wheels in tricycle position; Fig. 2 is a rear elevation of the structure shown in Fig. 1; Fig. 3 is a side elevation showing a fragment of the vehicle with the traction wheel in bicycle position and the auxiliary wheel in folded position; Fig. 4 is a plan view of the structure shown in Fig. 3; Fig. 5 is a fragmentary plan view showing as seen on the line 5—5 of Fig. 1; Fig. 6 is a rear elevation of the vehicle showing the bicycle and tricycle wheels in ground engaging position; Fig. 7 is a plan view showing a fragment of the vehicle with the auxiliary wheel in combination bicycle and tricycle positions; Fig. 8 is a detail view of a fragment of a foldable arm and a spindle knuckle, the latter being shown in section; Figs. 9 and 10 are respectively a front elevation partly in section and a side elevation of a strut rod; Figs. 11 and 12 are sections as seen on the lines 11—11 and 12—12 of Fig. 9; Fig. 13 is a front elevation partly in section of a tie rod; and Fig. 14 is a plan view of a tie rod.

Referring with more particularity to the drawings, a motorcycle of standard construction is indicated generally by 15. It is provided with the usual frame 16 and is supported by means of a steerable front wheel 17 and a rear traction wheel 18. The front wheel is mounted upon a common type of forked member 19 and controlled by handle bars 20. A motor together with transmission gear casing and accessories is conventionally shown by 21. The operator's seat is marked 22. As the details of structure of the motorcycle are not pertinent to the present invention, they will not be further described.

At the rear of frame 16 is a plate 23 of U form with legs straddling the traction wheel 18. This plate may be suitably reinforced for rigidity. Mounted on each of the legs of plate 23 are eye brackets 24 having pins 25 mounted therein. An arm 26 is pivotally mounted at its inner end upon pin 25 so that it may be swung thereon. Each arm 26 is shown as being bifurcated at its pivotal end. Supported at the outer end of the arms 26 are spindles 27, see Fig. 8. Mounted upon each pintle is a spindle knuckle 28 having spindles with auxiliary wheels 29 journalled thereon. It will be noted that the pivotal axes for the arm 26 and formed by pins 25 are inclined from the vertical so that when the arms are swung, it will change the position of the auxiliary wheel with respect to the ground level.

Each spindle knuckle has a steering arm 30. By referring to Fig. 8, it will be noted that the knuckles are arranged to have a longitudinal movement upon the knuckle pins 27 as well as a pivotal movement, but are yieldingly held in lower position by compression springs 31. Tie rods 32 are attached to the steering arms 30 by ball and socket joints 33. At the end of each tie rod is an eye 34 mounted upon pin 25. Referring particularly to Figs. 13 and 14, it will be noted that the tie rods are of telescopic construction, there being a hollow socket section 32*a* slidably receiving a shank section 32*b*. Shank 32*b* is provided with three notches 35*a*, 35*b* and 35*c*. Mounted in a box on the socket section is a detent 36, having a lug arranged to be disposed in any one of the notches. A pivotally mounted lever 37 has one end engaging the detent 36 and the other end is urged by a compression spring 38 into a position tending to depress the detent. The detent is normally urged into engagement with one of the notches in the shank and when disposed in one of these notches, prevents telescoping, making the rod rigid longitudinally. However, the detents may be disengaged from the notches and telescoping permitted when desired, disengagement being effected by depressing the outer end of thumb lever 37.

Adjacent the outer end of each arm 26 is a ball 39. A second similar ball 40 is secured to each arm ajacent the outer end and just below ball 39. A third ball 41 is mounted upon each arm 26 at a location nearer the pin 25 than balls 39 and 40. Each of these balls constitute a member of a ball and socket joint. A strut rod 42 is attached at one end by a ball and socket joint 43 to the frame 16 of the vehicle, and has its other end provided with a socket clamp 44. The socket clamp 44 is split in the plane of the axis of the shank of the ball it is to embrace. Half of the socket is formed integral with the rod and the other half is formed in a cap 45 which is pivotally secured to the rod by a bolt 46. Cap 45 has a channel shaped extension 47 adapted to embrace rod 42 and arranged to be held in that position by a sleeve 48 slidably mounted on rod 42 and having a part of its bore tapered to receive the end of the clamp member 44. A compression spring 49 is mounted on rod 42 between a shoulder 50 and sleeve 48. When it is desired to engage the socket from one of the ball members, sleeve 48 is moved against the spring 49 a sufficient distance to clear the end of its cap member 47 and permit the latter to be swung about bolt 46 to release the ball. The draw bar by which the machine may be towed is indicated generally by 51. The details of construction are not pertinent to the present invention, as the draw bar forms no part thereof.

In towing position, parts of the vehicle will be in the positions shown in Figs. 1, 2 and 5. Auxiliary wheels 29 are in ground engaging position and the traction wheel 18 of the bicycle is elevated above the ground so that in effect a tricycle is formed. It will be noted from an inspection of Fig. 5, that in this position, the strut rods 42 are secured to the balls 39, arms 26 being maintained in their furthermost forward operating position. Tie rods 32 are adjusted with their detents in the notches 35*c* giving the greatest extension of the tie rods and maintaining the wheels 29 in alinement with the bicycle wheels.

To convert the vehicle from a tricycle to a four-wheel vehicle, detents 36 on the tie rods are released and the tie rods telescopically adjusted so that the detents engage notches 35*b*. The clamp socket caps 45 on each of the strut rods 42 are released from the balls 39 and the arms 26 are then swung to intermediate position and the clamp sockets engaged with balls 40. This will have caused the auxiliary wheels to be lowered to a position such that they are on the ground level and together with the traction wheel 18 which has thus been lowered, the vehicle will be supported upon four wheels. In this position, the vehicle can be operated under its own power since the wheels 29 are resiliently supported to accommodate themselves to irregularities in the road surface. It will also be obvious that there is a spring action when the vehicle is in tricycle position. To place the parts of the machine in bicycle position, detents 36 are elevated, and the tie rods 32 are engaged with notches 35*a*, which causes the wheels 29 to be folded into the positions shown in Figs. 3 and 4, with respect to the arms 26. The socket clamps on the strut rods 42 are attached to ball members 41. This serves to hold the arms folded against the frame of the machine. A tension spring 52 may be connected to the parts as shown in Fig. 4, in order to hold the arms and their associated parts against rattling. The several operations of converting the vehicle from one type to another has been described, but such description is not intended to follow the sequence of steps in manipulating the parts. The sequence employed will be that which the operator finds most convenient according to the circumstances.

As stated above, the pivotal axes of the arms 26 are inclined so that when the arms are swung the position of the auxiliary wheel will change with respect to the ground level. Hence when all four wheels of the device are on the ground and the strut rods 42 are connected to the balls 39, if it then be desired to change to the three wheel position, that is, with the driving wheel elevated, one of the strut rods can be disconnected from the ball 39 and the associated telescopic rod detent 36 can then be removed from the notch 35 (see Fig. 13). With the strut rod and telescopic tie rod thus both disconnected the associated auxiliary wheel supporting arm 26 may then be rotated forwardly with respect to the motorcycle drive wheel. In view of the inclination of the pivotal axis of the arm, and in view of the fact that the other auxiliary wheel is stationary and locked, the driving wheel will thus be partially elevated. When the bracket has thus been moved sufficiently the detent 36 will automatically slide into the notch or recess 35*c*, and the strut rod can then be clamped to the ball 40. Similar unlocking of the strut and tie rods associated with the other auxiliary wheel, followed by forward rotation of that arm and subsequent locking of the strut and tie rods in the new position, will cause the complete elevation of the driving wheel, thus putting the motorcycle in the three wheel position suitable for towing. To restore the cycle to the four wheel position the above operations are simply reversed in an obvious manner.

It should be observed that because the auxiliary wheels are used for holding the drive wheel off the ground when the cycle is being towed, these wheels should in that position be mutually spaced apart approximately in the relation shown in the drawings, that is, sufficiently far from each other so that when the motorcycle is being towed behind an automobile at a high speed and around curves and over bumps and crosswalks, and other common road irregularities, the motorcycle will never be unbalanced and be caused to tip over. Also it is evident that the auxiliary wheels as shown do have and should have a diameter great enough so that they will easily override the common road obstructions and irregularities and so that they may be equipped preferably with pneumatic tires of ordinary construction.

What I claim is:—

1. A convertible bicycle comprising a frame having bicycle wheels in line, one of said bicycle wheels being a traction wheel; a pair of arms, one pivotally mounted on each side of said frame upon a pivotal axis inclined in relation to the ground level of said bicycle wheels whereby said arm may be positioned outwardly from said frame with its outer end at a lower ground level or inwardly with its outer end at a higher ground level, a resiliently mounted spindle member at the outer end of each arm, tricycle wheels journalled on said spindle member, said tricycle wheels being placed on said arms so that when said arms are disposed in one outward position they will engage the ground and hold said traction wheel out of ground engaging position and in a second outward position will resiliently engage the ground together with said traction wheel and when in inner position said tricycle wheels will be disposed above ground engaging position, and means to selectively lock said arms to said frame in any one of the three positions.

2. A convertible bicycle comprising a frame having bicycle wheels in line, a pair of arms, one pivotally mounted on each side of said frame upon a pivotal axis inclined in relation to the ground of said bicycle wheels whereby said arm may be positioned outwardly from said frame with its outer end at a lower ground level or inwardly with its outer end at a higher ground level, a pair of spindle knuckles resiliently mounted on said arms at the outer ends thereof, tricycle wheels journalled on the spindles of said knuckles, whereby said tricycle wheels may be resiliently held in ground engaging position, a pair of telescopic tie rods, one connected to each knuckle and anchored at its other end to said frame for positioning its tricycle wheel in travelling alinement with said bicycle wheels when said arm is in outer position and for lying flat in relation to said frame in inner position of said arm, means to lock said tie rods against extension or contraction with said tricycle wheels in either position, and means to selectively lock said arms in either said inner or outer position.

3. A convertible bicycle comprising a frame having bicycle wheels in line, one of said bicycle wheels being a traction wheel, a pair of arms, one pivotally mounted on each side of said frame upon a pivotal axis inclined in relation to the ground level of said bicycle wheels whereby said arm may be positioned outwardly from said frame with its outer end at a lower ground level or inwardly with its outer end at a higher ground level, a pair of spindle knuckles resiliently mounted on said arms at the outer ends thereof, tricycle wheels journalled on the spindles of said member, said tricycle wheels being placed on said arms so that when said arms are disposed in one outward position they will engage the ground and hold said traction wheel out of ground engaging position and in a second outward position will resiliently engage the ground together with said traction wheel and when in inner position said tricycle wheels will be disposed above ground engaging position, a pair of telescopic tie rods, one connected to each knuckle and anchored at its other end to said frame for positioning its tricycle wheels in travelling alinement with said bicycle wheels when said arm is in either of its outer positions and for lying flat in relation to said frame in inner position of said arm, means to lock said tie rods against extension or contraction with said bicycle wheels in any one of their three positions, and means to selectively lock said arms to said frame in any one of their three positions.

4. A convertible bicycle comprising a frame having bicycle wheels in line, a pair of arms, one pivotally mounted on each side of said frame upon a pivotal axis inclined in relation to the ground level of said bicycle wheels whereby said arm may be positioned outwardly from said frame with its outer end at a lower ground level or inwardly with its outer end at a higher ground level, a spring mounted spindle member at the outer end of each arm, tricycle wheels journalled on the spindle members whereby said tricycle wheels are resiliently held in lower position on said arms and when said arms are in an outer position all of said wheels will be in ground engaging position, a pair of strut rods, each strut rod being secured at one end of said frame and having a clamp for attachment to a corresponding arm at the other end, means on said arms for securing said strut rod thereto in two positions, one for maintaining said arms in said outer position and the other for maintaining said arms in said inner position.

5. A convertible bicycle comprising a frame having bicycle wheels in line, one of said bicycle wheels being a traction wheel, a pair of arms, one pivotally mounted on each side of said frame upon a pivotal axis inclined in relation to the ground level of said bicycle wheels whereby said arm may be positioned outwardly from said frame with its outer end at a lower ground level or inwardly with its outer end at a higher ground level, a resiliently mounted spindle member at the outer end of each arm, tricycle wheels journalled on said spindle members, said tricycle wheels being placed on said arms so that when said arms are disposed in one outward position they will engage the ground and hold said traction wheel at a ground engaging position, and in a second outward position will resiliently engage the ground together with said traction wheel and when in inner position said tricycle wheels will be disposed above ground engaging position, a pair of strut rods, each rod being secured at one end to said frame and having a clamp for attachment to a corresponding arm at the other end, means on said arms for securing said strut arms thereto in three positions, one for maintaining said arms in the first outer position, another for maintaining said arms in said second outer position and a third for maintaining said arms in said inner position.

6. A convertible bicycle comprising a frame having bicycle wheels in line, a pair of arms, one pivotally mounted on each side of said frame upon a pivotal axis inclined in relation to the ground level of said bicycle wheels whereby said arm may be positioned outwardly from said frame with its outer end at a lower ground level or inwardly with its outer end at a higher ground level, spindle knuckles resiliently mounted on said arms at the outer ends thereof, tricycle wheels journalled on the spindles of said knuckles whereby said tricycle wheels are resiliently held in lower position on said arms and when said arms are in outer position all of said wheels will be in ground engaging position, a pair of telescopic tie rods, one connected to each knuckle and anchored at its other end to said frame for positioning a tricycle wheel in travelling alinement with said bicycle wheels when said arm is in outer position and for lying flat in relation to said frame in inner position of said arm, means to lock said tie rods against extension or contraction with said tricycle wheels in either position, a pair of strut rods, each strut rod being secured at one end to said frame and having a clamp for attachment to a corresponding arm at the other end, means on said arms for securing said strut rods thereto in two positions, one for maintaining said arms in said outer position and the other for maintaining said arms in said inner position.

7. A convertible bicycle comprising a frame having bicycle wheels in line, one of said bicycle wheels being a traction wheel, a pair of arms, one pivotally mounted on each side of said frame upon a pivotal axis inclined in relation to the ground level of said bicycle wheels whereby said arm may be positioned outwardly from said frame with its outer end at a lower ground level or inwardly with its outer end at a higher ground level, spindle knuckles resiliently mounted on said arms at the outer ends thereof, tricycle wheels journalled on the spindles of said knuckles, said tricycle wheels being placed on said arms so that when said arms are disposed in one outward position they will engage the ground and hold said traction wheel out of ground engaging position and in a second outward position will resiliently engage the ground together with said traction wheel and when in inner position said tricycle wheels will be disposed above ground engaging position, a pair of telescopic tie rods, one connected to each knuckle and anchored at its other end to said frame for positioning, a tricycle wheel in travelling alinement with said bicycle wheels when said arm is in either of its outer positions and for lying flat in relation to said frame in inner position of said arms, means to lock said tie rods against extension or contraction with said tricycle wheels in any one of the three positions, a pair of strut rods, each strut rod being secured at one end to said frame and having clamps for attachment to corresponding arms at the other ends, means on said arms for securing said strut rods thereto in three positions, one for maintaining said arms in said first outer position, another for maintaining said arms in said second outer position and a third for maintaining said arms in said inner position.

8. An attachment for a bicycle comprising a wheel support adapted to straddle the driving wheel of the bicycle, a pair of auxiliary wheels, and means for resiliently mounting said auxiliary wheels on said support, one on each side of said driving wheel for movement between a first position in which said auxiliary wheels engage the ground below the level of the driving wheel when the bicycle is upright, a second position in which the auxiliary wheels engage the ground substantially level with the driving wheel and a third position in which the auxiliary wheels are above the ground.

9. An attachment for a bicycle comprising a wheel support adapted to straddle the driving wheel of the bicycle, a pair of brackets pivotally secured to said support, one on each side of said driving wheel, an auxiliary wheel journalled to each bracket, said brackets being movable on said pivots to a first position in which said auxiliary wheels engage the ground below the level of the driving wheel, when the bicycle is upright, a second position in which the auxiliary wheels engage the ground substantially level with the driving wheel and a third position in which the auxiliary wheels are above the ground, and resilient means supporting said auxiliary wheels relative to said support to permit vertical movement of said auxiliary wheels relative to said driving wheel when said auxiliary wheels are in said second position.

10. An attachment for a bicycle comprising a wheel support adapted to straddle the driving wheel of the bicycle, a pair of brackets pivotally secured to said support one on each side of said driving wheel, a knuckle resiliently connected to each bracket, a wheel journalled to each knuckle, said brackets being movable on said pivots to a first position in which said auxiliary wheels engage the ground below the level of the driving wheel when the bicycle is upright, a second position in which the auxiliary wheels engage the ground substantially level with the driving wheel, and a third position in which the auxiliary wheels are above the ground.

11. An attachment for a bicycle comprising a wheel support adapted to straddle the driving wheel of the bicycle, a pair of brackets pivotally secured to said support, one on each side of said driving wheel, a knuckle pivotally secured to each of said brackets, a wheel journalled on each of said knuckles, said brackets being movable on their pivotal supports to a first position in which said auxiliary wheels engage the ground below the level of the driving wheel when the bicycle is upright, a second position in which the auxiliary wheels engage the ground substantially level with the driving wheel and a third position in which the auxiliary wheels are above the ground, a tie-rod connecting each knuckle with said support to maintain said auxiliary wheels in parallel alignment with said driving wheel in any one of said three positions.

12. An attachment for a bicycle comprising a wheel support adapted to straddle the driving wheel of the bicycle, a pair of brackets pivotally secured to said support, one on each side of said driving wheel, a knuckle pivotally secured to each of said brackets, a wheel journalled on each of said knuckles, said brackets being movable on their pivotal supports to a first position in which said auxiliary wheels engage the ground below the level of the driving wheel when the bicycle is upright, a second position in which the auxiliary wheels engage the ground substantially level with the driving wheel and a third position in which the auxiliary wheels are above the ground, a tie-rod connecting each knuckle with said support to maintain said auxiliary wheels in parallel alignment with said driving wheel in any one of said three positions, and means for adjusting the length of said tie-rod to determine the angle between the plane of movement of said auxiliary wheels relative to said driving wheels.

13. In combination with a motorcycle, auxiliary wheels and means mounting them on opposite sides of the cycle arranged for movement into elevated position close together substantially vertical and parallel to each other, for movement into one extended position contacting the ground together with the motorcycle wheels, and for movement into another extended position supporting one wheel of the motorcycle above the ground and with the auxiliary wheels then mutually spaced apart sufficiently for supporting and balancing the motorcycle while being towed.

14. In combination with a motorcycle, auxiliary wheels and means mounting them on opposite sides of the cycle arranged for movement into elevated position close together substantially vertical and parallel to each other, for movement into one extended position yieldably contacting the ground together with the motorcycle wheels, and for movement into another extended position supporting one wheel of the motorcycle above the ground and with the auxiliary wheels then mutually spaced apart sufficiently for supporting and balancing the motorcycle while being towed.

15. In combination with a motorcycle, auxiliary wheels and means mounting them on opposite sides of the cycle arranged for movement, while being vertically maintained, into retracted elevated position close together, for movement into one extended position contacting the ground together with the motorcycle wheels, and for movement into another extended position supporting one wheel of the motorcycle above the ground and with the auxiliary wheels then mutually spaced apart sufficiently for supporting and balancing the motorcycle while being towed.

16. In combination with a motorcycle having a drive wheel, auxiliary wheels and means mounting them on opposite sides of the cycle arranged for movement always substantially parallel to the drive wheel into retracted elevated position close to the drive wheel, for movement into one extended position yieldably contacting the ground together with the drive wheel, and for movement into another extended position supporting the drive wheel above the ground and with the auxiliary wheels then mutually spaced apart sufficiently for supporting and balancing the motorcycle while being towed.

17. In combination with a motorcycle having a drive wheel, auxiliary wheels and means mounting them on opposite sides of the cycle arranged for movement into retracted elevated position close to the drive wheel and substantially parallel to each other, for movement into extended position supporting the drive wheel above the ground and with the auxiliary wheels then mutually spaced apart sufficiently for supporting and balancing the motorcycle while being towed and for movement into an extended position contacting the ground together with the drive wheel in substantially the same mutually spaced apart relation.

18. In combination with a motorcycle having a drive wheel, auxiliary wheels and means mounting them on opposite sides of the cycle arranged for movement into retracted elevated position close to the drive wheel and substantially parallel to each other, for movement into extended position supporting the drive wheel above the ground and with the auxiliary wheels then mutually spaced apart sufficiently for supporting and balancing the motorcycle while being towed and for movement into an extended position yieldably contacting the ground together with the drive wheel in substantially the same mutually spaced apart relation.

19. In combination with a motorcycle having a drive wheel and a pair of side wheels, means mounting said side wheels on the motorcycle constructed and arranged for retracting the side wheels upwardly close together adjacent the drive wheel, and arranged for extending the side wheels yieldingly in contact with the ground without raising the drive wheel and mutually spaced apart sufficiently to balance the motorcycle whether being towed or self-propelled.

20. In combination with a motorcycle having a drive wheel, a pair of side wheels and means for mounting then on the motorcycle arranged for movement into one position elevated from the ground and close together, into a second position contacting the ground yieldingly along with the drive wheel but widely spaced apart therefrom, and into a third position holding the drive wheel off the ground and mutually spaced apart sufficiently to balance the motorcycle when being towed.

21. In combination with a motorcycle having a drive wheel, a pair of side wheels and means for mounting them on the motorcycle arranged for movement into one position elevated from the ground and close together, into a second position contacting the ground yieldingly along with the drive wheel but widely spaced apart therefrom, and into a third position holding the drive wheel off the ground and mutually spaced apart sufficiently to balance the motorcycle when being towed, and means for locking the side wheels in each of the three positions.

22. In combination with a motorcycle having a drive wheel, auxiliary wheels and means for mounting them on opposite sides thereof arranged for movement into retracted elevated position, into one extended position contacting the ground along with the drive wheel, and into another extended position supporting the drive wheel above the ground and mutually spaced apart sufficiently for balancing and supporting the motorcycle while being towed, said mounting means being constructed and arranged so that each wheel may be separately moved from the second to the third said positions thus causing partial elevation of the drive wheel.

23. In combination with a motorcycle having a drive wheel and auxiliary wheels on opposite sides thereof, means for supporting and extending said side wheels into one extended position contacting the ground along with the drive wheel and into another extended position holding the drive wheel off the ground constructed and arranged so that the auxiliary wheels are manually movable from the first into the second position and thus cause the elevation of the drive wheel.

24. In combination with a motorcycle having a drive wheel and a pair of auxiliary wheels, means for connecting the auxiliary wheels to the motorcycle for movement into one extended position contacting the ground along with the drive wheel and into another extended position at substantially the same distance from the drive wheel supporting the drive wheel above the ground and mutually spaced apart sufficiently to balance the motorcycle while being towed, said auxiliary wheels having a diameter sufficient to enable them while being towed to override the same road irregularities that are overridden successfully by the motorcycle wheels, said connecting means being further arranged for retracting and elevating the auxiliary wheels into a snug relation with the drive wheel for rendering the entire device serviceable as a two-wheel motorcycle.

25. In combination with a motorcycle having a drive wheel, a pair of auxiliary wheels and means mounting them on opposite sides of the cycle arranged for movement always substantially parallel to the drive wheel into retracted elevated position close to the drive wheel, for movement into extended position yieldably contacting the ground along with the drive wheel, and into another extended position supporting the drive wheel above the ground while being mutually spaced apart sufficiently for supporting and balancing the motorcycle while being towed, said auxiliary wheels having a diameter sufficient to enable them while being towed to override the same road irregularities which are normally overridden by the motorcycle wheels.

In witness of the foregoing I affix my signature.

ALBERT LAURANCE HESS.